United States Patent [19]

Churchill

[11] E Re. 29,949

[45] Reissued Apr. 3, 1979

[54] METHOD OF CONSTRUCTING BILATERAL HEATER UNIT

[76] Inventor: John W. Churchill, 12 Winthrop Ave., Beverly, Mass. 01915

[21] Appl. No.: 854,058

[22] Filed: Nov. 23, 1977

Related U.S. Patent Documents

Reissue of:

[64] Patent No.: 3,934,333
Issued: Jan. 27, 1976
Appl. No.: 527,186
Filed: Nov. 26, 1974

U.S. Applications:

[62] Division of Ser. No. 382,295, Jul. 25, 1973, Pat. No. 3,982,099.

[51] Int. Cl.[2] ..... H05B 3/00

[52] U.S. Cl. ..... 29/611; 29/615; 29/619; 338/238; 338/242

[58] Field of Search ..... 29/611, 613, 614, 615, 29/617, 619; 219/523, 541, 544, 552; 338/238, 239, 240, 241, 242, 333

[56] References Cited

U.S. PATENT DOCUMENTS

| | | | |
|---|---|---|---|
| 1,960,221 | 5/1934 | Kelly et al. | 29/614 |
| 2,157,884 | 5/1939 | Backer | 29/617 |
| 2,375,058 | 5/1945 | Wiegand | 29/611 X |
| 2,483,839 | 10/1949 | Oakley et al. | 29/614 |
| 2,846,537 | 8/1958 | Thornhill | 29/615 X |
| 2,876,322 | 3/1959 | Boggs | 201/67 |
| 2,933,805 | 4/1960 | McOrlly | 29/615 |
| 3,007,235 | 11/1961 | Yohe | 29/619 X |
| 3,330,034 | 7/1967 | Price | 29/611 |

FOREIGN PATENT DOCUMENTS

| | | | |
|---|---|---|---|
| 466060 | 5/1937 | United Kingdom | 338/240 |

*Primary Examiner*—C. W. Lanham
*Assistant Examiner*—Gene P. Crosby
*Attorney, Agent, or Firm*—Craig & Antonelli

[57] ABSTRACT

A heater unit of bilateral construction is formed by forming a resistor assembly of a resistor helix extending between cylindrical terminals and overlapping the same, inserting the assembly in a sheath tube, filling the tube with MgO powder, placing laminated mica end plugs over the terminals and extending into the ends of the tube, bending the tube into a U-shape, pressing the legs of the U together and feeding the pressed unit through swaging dies to deform the tube over the entire length thereof to provide a heater unit of substantially circular cross section and having two legs of substantially semicircular cross section. The resistor helix in the area of the leg portions has a cross-sectional shape corresponding to the cross-sectional shape of the sheath and the terminals and mica plugs within the sheath are flattened to provide a similar cross-sectional shape thereby locking the terminals within the sheath.

16 Claims, 15 Drawing Figures

FIG. 1a
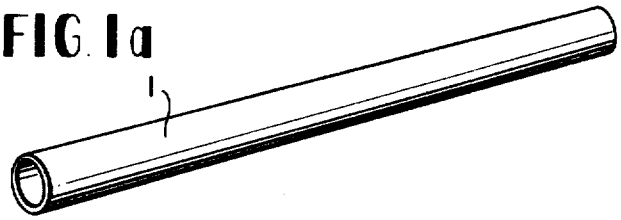
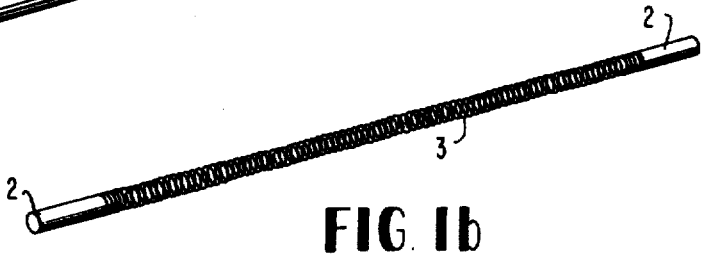
FIG. 1b
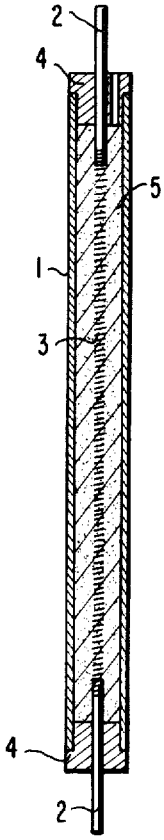
FIG. 1c
FIG. 1d
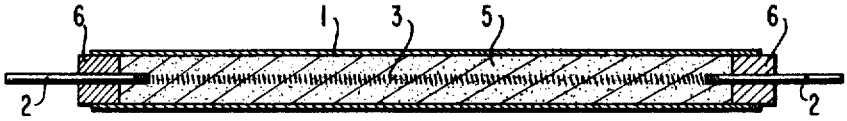
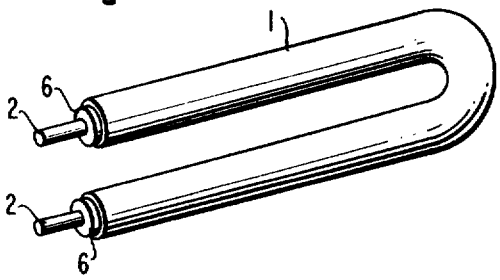
FIG. 1e
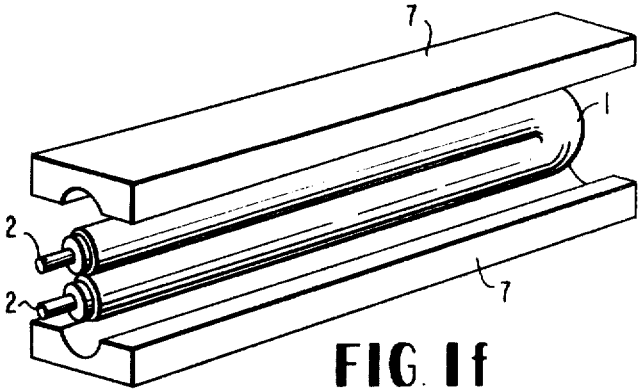
FIG. 1f
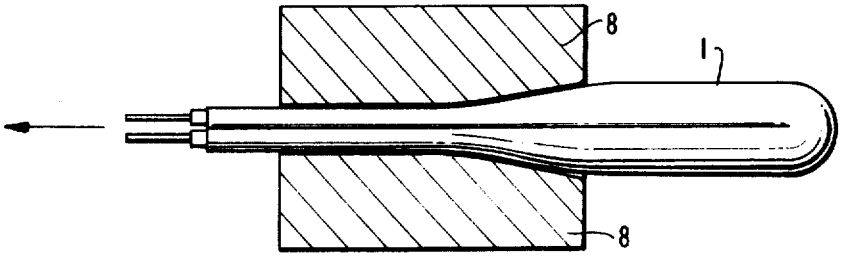
FIG. 1g

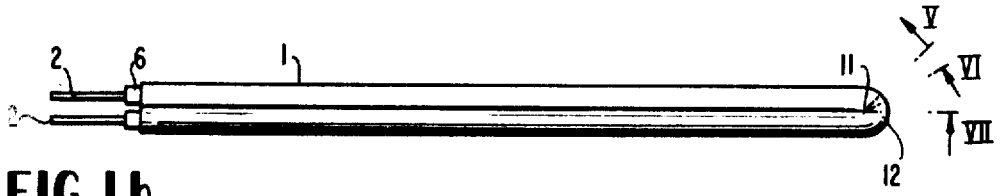
FIG. 1h
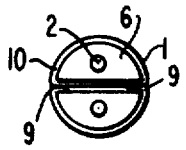
FIG. 1i
FIG. 2
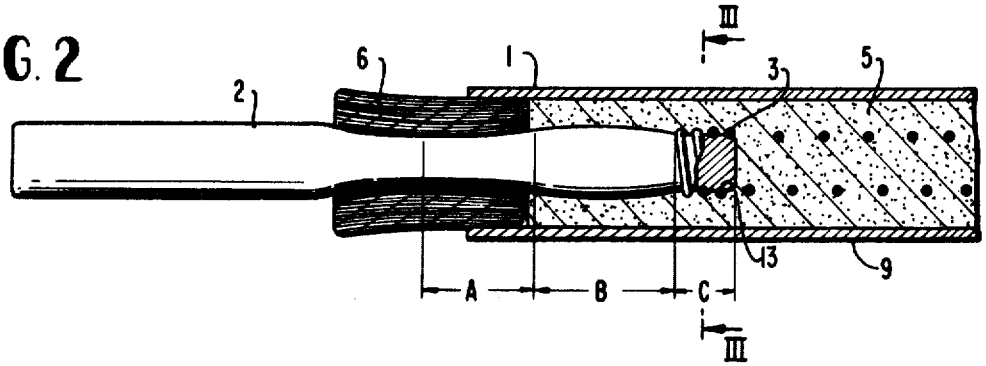
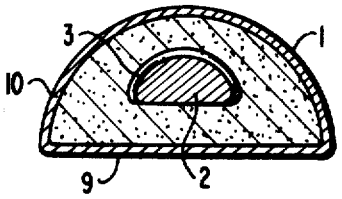
FIG. 3
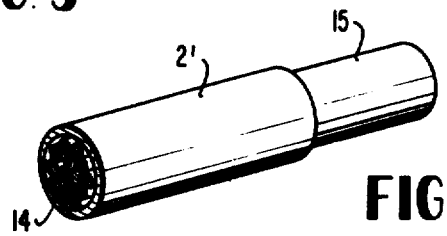
FIG. 4
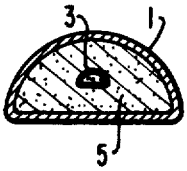
FIG 5
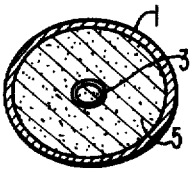
FIG. 6
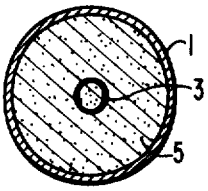
FIG. 7

METHOD OF CONSTRUCTING BILATERAL HEATER UNIT

Matter enclosed in heavy brackets [ ] appears in the original patent but forms no part of this reissue specification; matter printed in italics indicates the additions made by reissue.

This is a division of application Ser. No. 382,295, filed July 25, 1973, *now Pat. No.* 3,982,099.

The present invention relates to a cartridge type or tubular heater unit having a bilateral construction and a method for constructing the same.

Tubular or cartridge type heater units have many uses and for example, may be utilized as insertion units wherein the heaters are inserted into a drilled hole in a worktable or the like for heating the table surface. The cartridge heater units are generally constructed with an outer tubular sheath, an inner core which supports a resistor winding as well as positioning and anchoring two terminal studs at the same end of the unit, and MgO powder filling the annular space between the resistor assembly and the sheath whereby the unit is reduced in diameter after the ends thereof are capped. The diameter reduction of the sheath and unit compacts the MgO and the crushable core providing an increased density of the MgO and improves both the electrical insulating value and thermal conductivity of the unit. However, the diameter reduction and densification of the MgO is limited by the presence of the core in the unit.

It is also known to form a tubular heater unit by inserting into a metal tube, magnesium metal strips or the like together with a coiled resistance wire and placing the assembled element into an autoclave filled with water so that the tube is covered with water. The autoclave is then heated to cause crystalline magnesium hydroxide to be formed in the tube such that the resistance coil is completely embedded in the hydroxide. Thereafter, the tube is heated to partially convert the magnesium hydroxide into magnesium oxide with powder insulation being added and terminals assembled into both ends of the tube. The tube is then deformed by pressing between dies to form, for example, a semicircular cross-sectional shape, with the tube being bent at a later stage into a hairpin form and pressed together to provide a circular cross section with terminals at the same end of the element. In this construction, the tube is again heated to completely convert the magnesium hydroxide to crystalline magnesium oxide and deformed again to recompact the crystalline magnesium oxide. This construction has several disadvantages including the requirement for crystalline magnesium hydroxide to be formed within the tube and then converted to crystalline magnesium oxide by means of several heating steps and additionally requires a pressing deformation operation with substantially no circumferential reduction and elongation of the tube as occurs with a swaging operation. Additionally, there is the requirement for two pressing operations for compacting and recompacting of the insulation and the bending of the tube has a tendency to create fissures in the crystalline insulating material reducing the service life of such unit.

It is therefore an object of the present invention to provide a heater unit and a method for constructing the same which overcomes the disadvantages of prior art units and construction methods.

It is another object of the present invention to provide a heater unit having an improved service life.

It is a further object of the present invention to provide a heater unit in which a good mechanical and electrical connection is obtained between the terminals and the resistor wire due to compaction of powder insulation during the formation of the heater unit.

It is another object of the present invention to provide a heater unit in which the terminals become locked within the sheath of the heater unit as a result of a swaging operation over the entire length of the sheath of the heater unit.

It is still another object of the present invention to provide a heater unit with a bilateral construction wherein the resistance wire is surrounded by a sheath over the entire length thereof and spaced from the sheath by compacted powder insulating material.

In accordance with the present invention, a heater unit of bilateral construction is formed by forming a resistor assembly, inserting the assembly in a sheath tube, filling the tube with MgO powder, placing laminated mica endplugs over the terminals of the resistor assembly and extending into the ends of the tube, bending the tube into a U-shape, pressing the legs of the U together and feeding the pressed unit through swaging dies so as to deform the tube over the entire length thereof to provide a heater unit of substantially circular cross section having two legs of substantially semicircular cross section.

In accordance with a feature of the present invention, the resistor assembly is formed by placing each end of an elongated resistor helix over respective end portions of cylindrical metal terminals and during the swaging operation, the portion of the metal terminals within the sheath as well as the resistor helix within the sheath attains a cross-sectional shape similar to that of the surrounding sheath whereby the terminals become locked within the sheath. Additionally, due to the compaction of the MgO powder, the resistor wire overlapping the end portions of the metal terminals form depressions in the end portions of the metal terminals and are disposed in such depressions such that a firm mechanical and electrical connection of the resistor helix and the terminals is attained.

In accordance with another feature of the present invention, the resistor helix in the interconnecting portion which is an extension of the two leg portions of the heater unit is provided with a cross-sectional shape corresponding to the sheath of the unit in the interconnecting portion which varies from a semicircular configuration to a cylindrical configuration. The interconnecting portion provides a 180° return bend at the outer portion of the sheath for the heater unit and has a substantially zero internal radius return bend at the inner portion of the heater unit forming the flat portion of the legs of the heater unit.

These and further objects, features and advantages of the present invention will become more apparent from the following description when taken in connection with the accompanying drawings which show, for purposes of illustration only, two embodiments in accordance with the present invention, and wherein:

FIGS. 1*a* to 1*i* are views illustrating the formation of a heater unit in accordance with the present invention;

FIG. 2 is a partial longitudinal cross-sectional view of the end portion of a leg of the heater in accordance with the present invention illustrating the deformation of the metal terminal;

FIG. 3 is a transverse cross-sectional view of the heater leg of FIG. 2 taken in the plane III–III;

FIG. 4 is a perspective view of a metal terminal construction in accordance with another embodiment of the present invention; and FIGS. 5, 6 and 7 are transverse cross-sectional views of the interconnecting portion of the heater unit in accordance with the present invention taken at different angles with respect to the flattened portion of the leg of the heater unit as indicated in FIG. 1*h*.

Referring now to the drawings wherein like reference numerals are utilized to designate like parts throughout the several views, there is shown in FIG. 1 the method steps for constructing the bilateral tubular heater unit in accordance with the present invention. As shown in FIG. 1*a*, a cylindrical tube 1 of the appropriate diameter for forming the sheath of the heater unit, for example, a 5/16 inch diameter tube for a 3/8 inch heater unit is selected. In accordance with the present invention and as shown in FIG. 1*b*, a resistor assembly is formed consisting of a cylindrical metal terminal 2, as will be more thoroughly described hereinafter, attached to the ends of a resistance helix 3 by means of a slight interference fit such that the resistor helix overlaps or extends over portions of the cylindrical metal terminal 2. The wire resistance helix, preferably has a helix diameter to wire diameter of at least 6 to 1. The assembly, as shown in FIG. 1*c*, is stretched through the tube sheath 1 and centrally positioned therein by fittings 4 with at least one fitting 4 having an opening or the like therein so as to permit granulated MgO powder 5 to be inserted into the tube such that the powder 5 fills the tube and passes through and around the resistor helix. The powder may be densified somewhat by vibration of the assembled heater so as to ensure that the MgO powder completely fills the tube 1. As shown in FIG. 1*d*, the fittings 4 are then removed and the ends of the tube 1 are capped by laminated mica plugs 6 which surround the cylindrical metal terminal 2. The mica plug is sized for a slide fit into the tube 1 and a slide fit around the terminal 2. It is placed approximately ⅛ inch into the heater and extends approximately ⅜ inch outside of the heater unit. Alternatively, the mica plug may extend completely within the tube sheath 1. Additionally, a metal terminal portion extends outwardly beyond the end of the laminated plug. The heater unit is then bent into a U-shape in a manner known in the art, as shown in FIG. 1*e*, with the legs then being pressed together, with radius tools 7 as shown in FIG. 1*f*. The tool radius is the same as that of the sheath tube in order to preserve the tube shape and diameter prior to a deforming operation such as swaging of the heater so that no deformation of the tube occurs during the pressing of the legs together as well as no compaction of the MgO. The deformation of the heater during this step would tend to precompact the MgO in the area of deformation whereas homogeneous MgO density is necessary for even commpaction during swaging. The heater is then passed as shown in FIG. 1*g* through the dies 8 of a rotary swaging machine, or the like, whereby the heater is progressively deformed over the entire length of the tube with a diameter reduction and an elongation of the tube occurring. The heater is progressively deformed into a cylindrical shape with substantially circular cross section with each leg of the heater being substantially semicircular in cross section and having a flat portion 9 and an arcuate portion 10 as shown in FIGS. 1*h* and 1*i*. As shown, the heater is provided with an internal radius bend portion 11 of substantially zero at the junction of the flat leg portions such that the leg portions at the junction are substantially in contact while the outer sheath is provided with a return bend portion 12 of substantially 180°. Additionally, as shown in FIG. 1*i*, the mica end plugs 6 are deformed into the same shape as the surrounding tube sheat 1, i.e., approximately semicircular, and as a result, become locked into the sheath.

As shown in FIG. 2, which is a partial cross-sectional view of the end portion of a heater leg in accordance with the present invention, the deformation of the mica end plugs is also transmitted to the metal terminals 2 which they surround such that the terminals are flattened to some extent as a result of the swaging process in the region A of the terminal, the terminal assuming a generally semicircular shape in this region. As a result of the swaging process, the MgO powder insulation 5 is compacted by the reduction of volume and also transmits pressure to the metal terminal 2 to flatten and roughen the surface thereof in the region B which aids in locking the terminal within the heater unit. In the region C of the resistor wire helix wrap 3 on the metal terminal 2, the MgO while flattening the terminal, also presses the turns of the wire wrap into the surface of the terminal creating individual depressions 13 in the terminal and into which the wire wrap is disposed. A firm electrical and mechanical connection between the wire helix and the metal terminal is thus established. The MgO also transmits pressure to the resistor helix 3, deforming it to a shape corresponding to that of the shape of the surrounding sheath with the MgO being compacted.

The metal terminals 2 of the present invention may be in the form of a solid metal cylindrical stud, a hollow tubular stud, or a stud having a hollow portion. In any case, the wire helix is wrapped around the end portion of the terminal as indicated in FIG. 1 and the swaging of the heater is carried out over the entire length of the heater sheath such that the terminal 2, in addition to the heater sheath is flattened or deformed to some extent as shown in FIG. 2. The starting cylindrical terminal 2 extending within the sheath area deforms to a shape corresponding to the shape of the sheath such that it has a substantially semicircular cross section as shown in FIG. 3, which is a section taken in the plane III–III in FIG. 2. The solid terminal is generally formed of a ductile solid rod, for example, a solid nickel cylinder of commercially pure nickel having a soft temper or Brinnell hardness of 92–120. The starting diameter of the rod terminal, of course, is variable in accordance with the dimensions of the heater unit, as well as with the size of the resistor helix utilized and other desired properties. The deformation of the starting cylindrical terminal, as shown in FIG. 3, is such that the terminal is provided with a width dimension extending parallel to the flattened portion 9 of the sheath tube as seen in cross section and with a thickness or height dimension extending in the transverse direction. The deformation of the terminal, for example, of a solid terminal with a starting diameter of 0.100 inches in several tests of a heater unit resulted in an average cross-sectional dimension of 0.079 inches in thickness or height by 0.098 inches in width in the area C under the wire wrap, 0.099 inches in thickness by 0.100 inches in width in the area B under the MgO powder, and 0.083 inches in thickness by 0.103 inches in width in the area A under the mica plug. It is noted, however, that depending upon the length of the area of the terminal portion B between the mica plug and the wire wrap, such portion will deform more or less. However, in general, there is a greater deformation of the terminal under the mica plug than under the wire wrap with a smaller deformation under the MgO powder. The hollow terminal whether a completely hollow tube or a drilled stud having a hollow portion deforms in substantially the same manner as the solid terminal with the hollow terminal offering the advantage that as shown in FIG. 4, a stranded flexible lead wire 14 may be inserted into the hollow terminal 2' which lead wire becomes anchored within the terminal due to the deformation of the terminal. The lead wire is provided with insulation 15 on the portion thereof extending outwardly from the terminal while the lead wire within the terminal is bare. For a hollow tubular terminal 2' having an outer diameter of 0.125 inches and a 0.017 inch thick wall and formed of stainless steel, the average deformation dimensions of such a terminal in a heater unit, in accordance with the present invention, resulted in a deformation of 0.069 inches in thickness or height by 0.164 inches in width in the area C under the wire wrap, 0.073 inches in thickness by 0.165 inches in width in the area B under the MgO, and 0.070 inches in thickness by 0.163 inches in width in the area A under the mica plug. Generally, as a result of experimentation, it has been found that the thickness of the solid terminal is approximately 66 percent of the starting diameter whereas the width is approximately 120 percent of the starting diameter. For a hollow terminal, the thickness of the hollow terminal is approximately 54 percent of the starting diameter with the width being approximately 130 percent of the starting diameter. Thus, in accordance with the present invention, the metal terminals deform to approximately the shape as the sheath and by providing a swaging operation in the area of the terminals such terminals become locked into the sheath as well as ensuring a good mechanical and electrical connection of the terminal to the resistor helix.

The resistor helix 3 is deformed by the compaction of the MgO powder to a shape corresponding to that of the surrounding sheath such that the resistor helix is also provided with a semicircular cross section in the area of the leg portions. However, in the area of the return bend, i.e., the interconnecting portion between the two leg portions, the shape of the sheath 1 and the corresponding shape of the resistor helix 3 varies as shown in FIGS. 5—7. As shown in FIG. 5, which is a cross-sectional view taken at an angle of 45° with regard to the flattened portion of the leg of the heater of FIG. 1*h*, the cross-sectional configuration of the sheath and helix is approximately semicircular in shape in the manner of the cross section of the entire leg. As shown in FIG. 6, which is a cross-section view taken at an angle of 30° with respect to the flattened portion of the leg and further into the return bend of the interconnecting portion of FIG. 1*h*, the sheath and the resistor helix has an oval or elliptical shape with the compacted MgO powder surrounding the resistor helix and spacing the helix from the outer sheath. As shown in FIG. 7, which is a cross-sectional view taken in the plane of the flattened portion of the leg or at 0° with respect to this flattened portion of FIG. 1*h*, the sheath has a substantially circular cross section although being deformed somewhat from a true circular cross section and the resistor helix has a corresponding shape with the MgO powder uniformly surrounding the resistor helix in order to space and insulate the same from the sheath. The shape of the sheath and resistor helix varies in the interconnecting portion since the shape of the legs of the heater unit is attained by the swaging operation and the interconnecting portion as well as the legs have a substantially cylindrical shape prior to the swaging operation. In this manner, the swaging operation does not cause the helix to cut through the MgO powder insulation and instead, the helix deforms to a final shape which at all points closely matches that of the surrounding sheath. The sharp corners of the coil turns, for example, match the adjacent sharp corners of the sheath at the flattened portion of the heater leg whereas at the return bend of the interconnecting portion, the coil has a different shape conforming to the sheath cross section. In this manner, there are no thin spots of MgO insulation and the heater easily withstands a dielectric voltage test of 2500 vrms.

The construction of a heater unit in accordance with the present invention provides a heater unit which is readily adapted to be inserted into a drilled hole of a worktable for heating the table surface as is known in the art. That is, due to the substantially circular cross section, a close fit can be obtained in accordance with the desired size of the drilled hole. Further, due to the bilateral construction of the heater unit in accordance with the present invention, upon heating of the unit, the legs have a tendency to bow out providing for intimate contact with the surface of the drilled hole in the worktable and better thermal conductivity therebetween. Additionally, due to the uniform distribution of the compacted MgO powder between the resistor helix and the tubular sheath, the heater unit is provided with good insulation characteristics thereby ensuring a long service life for the heater unit.

While I have shown and described several embodiments in accordance with the present invention, it is understood that the same is not limited thereto, but is susceptible of numerous changes and modification as known to those skilled in the art, and I therefore do not wish to be limited to the details shown and described herein, but intend to cover all such changes and modifications as are emcompassed by the scope of the appended claims.

I claim:

1. A method of forming a heater unit comprising the steps of forming a resistor assembly by placing each end of an elongated resistor [helix] *member* over respective end portions of cylindrical metal terminals such that the [helix] *resistor member* is detachably secured to the respective terminals and extends therebetween, arranging the resistor assembly in a metal tubular sheath such that the assembly extends in the longitudinal direction of the sheath, filling the sheath with granulated powdered insulating material, capping the ends of the tubular sheath with end plugs which are sized for a slide fit into the sheath and a slide fit around the cylindrical terminals which extend through the plugs, and deforming the tubular sheath over the entire length thereof to compact the powdered insulating material such that the end plugs and the metal terminals are deformed to a shape corresponding to the shape of the sheath in the region of the end plugs and metal terminals with the end plugs and terminals becoming lockingly secured within the sheath, at least a portion of the sheath in the region of the end plugs together with at least a portion of the end plugs and the metal terminals thereat being deformed out of round.

2. A method according to claim 1, wherein *the resistor member includes resistor wire and* the step of deforming the sheath includes compacting the powdered insulation to force the *resistor* wire [helix] overlapping the end portions of the metal terminals to form depressions in the surface of the metal terminals and become embedded therein.

3. A method according to claim 1, further comprising after the step of capping the ends of the tubular sheath, bending the tubular sheath having the resistor assembly and powdered insulating material therein into the shape of a U, pressing the legs of the U together while maintaining the same tube diameter, and then performing the step of deforming the tubular sheath over the entire length thereof to provide a heater unit having a substantially circular cross section formed by two substantially semicircular parallel extending leg portions interconnected by a portion of the tubular sheath having a 180° outer return bend.

4. A method according to claim 3, wherein the step of deforming includes providing a substantially zero internal return bend radius at the internal junction of the leg portions.

5. A method according to claim 4, wherein the step of deforming includes deforming the resistor [helix] *member* along the extent of the leg portions to a substantially semicircular cross-section shape corresponding to the cross-sectional shape of the leg portions, and maintaining sufficient insulation between the resistor [helix] *member* and the sheath to insulate and space the resistor [helix] *member* from the sheath.

6. A method according to claim 5, wherein the step of deforming includes deforming the resistor [helix] *member* in the area of the return bend to a cross-sectional shape corresponding to the cross-sectional shape of the sheath such that the resistor [helix] *member* has a substantially circular shape in the plane of the flat portion of the semicircular cross-section of the leg portions while maintaining sufficient outer insulation between the resistor [helix] *member* and the sheath to insulate and space the [helix] *resistor member* from the sheath.

7. A method according to claim 6, wherein *the resistor member includes resistor wire and* the step of deforming includes compacting the powdered insulation to force the *resistor* wire [helix] overlapping the end portions of the metal terminals to form depressions in the surface of the metal terminals and become embedded therein.

8. A method according to claim 2, including the step of utilizing cylindrical metal terminals in forming the resistor assembly, the terminals having an axially extending hollow portion therein, and placing a stranded flexible lead wire in the hollow portion of each of the metal terminals such that the lead wire extends outwardly beyond the end of the tubular sheath when the resistor assembly is placed within the tubular sheath.

9. A method according to claim 7, wherein the powdered insulating material is MgO powder and the end plugs are formed of laminated mica.

10. A method according to claim 1, wherein the step of deforming the portion of the sheath out of round includes deforming the sheath to form a substantially semicircular shape in cross-section.

11. A method of forming a heater unit comprising the steps of forming a resistor assembly by placing each end of an elongated resistor [helix] *member* over respective end portions of cylindrical metal terminals such that the [helix] *resistor member* is detachably secured to the respective terminals and extends therebetween, arranging the resistor assembly in a metal tubular sheath such that the assembly extends in the longitudinal direction of the sheath, filling the sheath with granulated powdered insulating material, capping the ends of the tubular sheath with end plugs which are sized for a slide fit into the sheath and a slide fit around the cylindrical terminals which extend through the plugs, bending the tubular sheath having the resistor assembly and powdered insulating material therein into the shape of a U, pressing the legs of the U together while maintaining the same tube diameter, and then deforming the tubular sheath over the entire length thereof to compact the powdered insulating material and to provide a heater unit having a substantially circular cross-section formed by two substantially semicircular parallel extending leg portions interconnected by a portion of the tubular sheath having a 180° outer return bend.

*12. A method according to claim 1, wherein the resistor member is a resistor helix.*

*13. A method according to claim 5, wherein the resistor member is a resistor helix.*

*14. A method according to claim 6, wherein the resistor member is a resistor helix.*

*15. A method according to claim 7, wherein the resistor member is a resistor helix.*

*16. A method according to claim 11, wherein the resistor member is a resistor helix.*

* * * * *